Inventor:
C. M. HOEREGOTT,
By W. T. Fitzgerald
Attorney.

July 1, 1924.

C. M. HOEREGOTT

CULTIVATOR SWEEP

Filed June 13, 1922 2 Sheets-Sheet 2

Inventor:
C. M. HOEREGOTT,
By W. J. Fitz Gerald & Co.
Attorney.

Patented July 1, 1924.

1,499,531

UNITED STATES PATENT OFFICE.

CARL M. HOEREGOTT, OF ALVIN, TEXAS.

CULTIVATOR SWEEP.

Application filed June 13, 1922. Serial No. 568,018.

*To all whom it may concern:*

Be it known that I, CARL M. HOEREGOTT, a citizen of the United States, residing at Alvin, in the county of Brazoria and State of Texas, have invented certain new and useful Improvements in Cultivator Sweeps; and I do hereby declare the following to be a full, clear, and exact description of the invention, such as will enable others skilled in the art to which it appertains to make and use the same.

The present invention relates to cultivator sweeps, and aims to provide a cultivator and its shank of novel and improved formation, which can be conveniently and effectively manufactured from a single piece or blank of sheet metal, and which will be strong in construction and durable.

Another object is to provide such a construction wherein the sweep proper and shank are so formed that the blade or blades thereof are effective for cutting the roots under the surface of the soil and for loosening and stirring the ground, and the shank being so formed as to make the construction rigid and substantial, with a minimum resistance to the draft, and the structure in its entirety being devoid of obstructions or portions on or in which the roots, trash, dirt and other foreign matter can accumulate or lodge.

With the foregoing and other objects in view, which will be understood as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1:
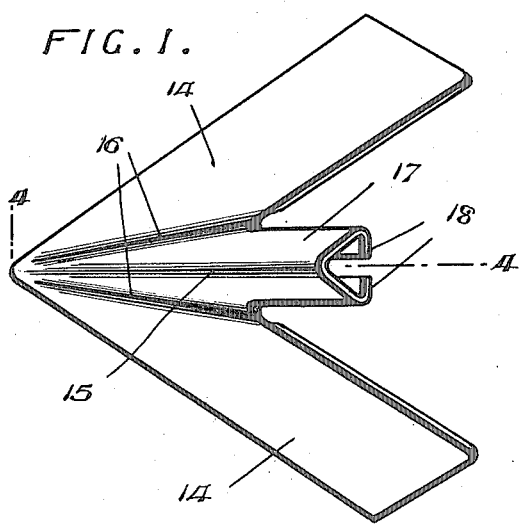
Figure 1 is a top plan view of the double wing sweep.
Figure 2:
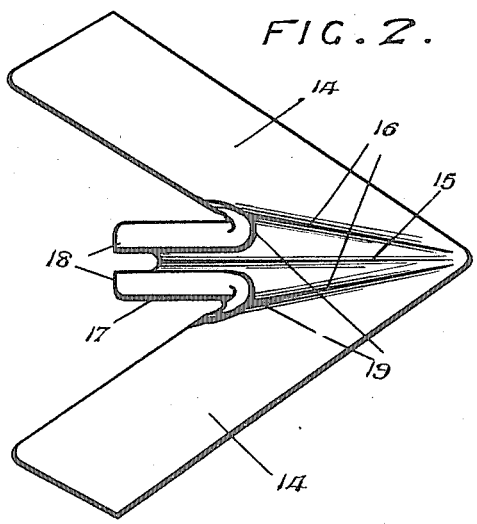
Fig. 2 is a bottom plan view thereof.
Figure 3:
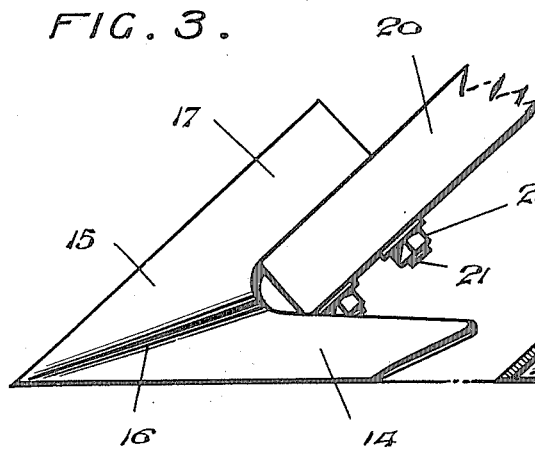
Fig. 3 is a side elevation showing the sweep secured to a standard or stock.
Figure 4:
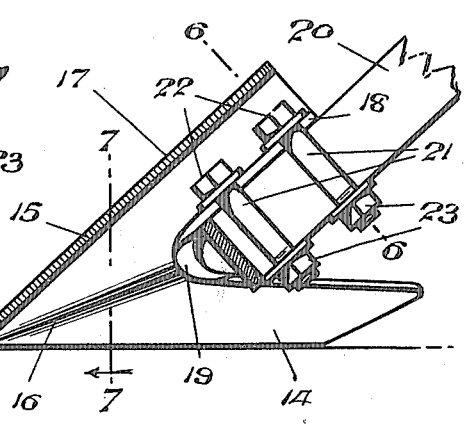
Fig. 4 is a section on the line 4—4 of Fig. 1 showing the sweep attached to the standard.
Figure 6:
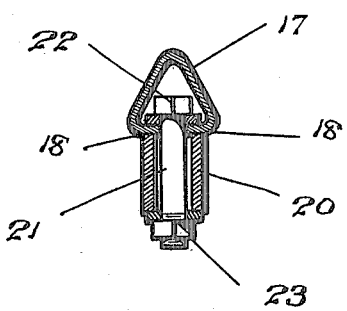
Fig. 6 is a cross section on the line 6—6 of Fig. 4.
Figure 7:
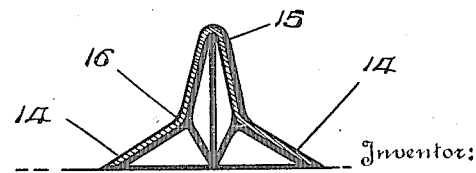
Fig. 7 is a transverse section on the line 7—7 of Fig. 4.

The cultivator sweep may be of different sizes and designs, and the form shown in Figs. 1 to 7, inclusive, has the rearwardly diverging wings or blades 14 at opposite sides, and said wings are suitably inclined. The forward oblique edges of the blades are sharp to cut the roots and soil, and said edges are disposed in a horizontal plane to travel under the surface of the soil substantially parallel therewith. The inclination of the wings is gentle so that roots and dirt can pass over the wings to drop in rear thereof, thereby not only cutting the roots of weeds, grass and other obnoxious vegetation, but also stirring and agitating the superficial portion of the soil evenly, with level cultivation.

The sweep is stamped or formed from a single plate or blank of sheet metal of suitable thickness, and the sweep is formed between the adjacent forward ends of the wings or blades 14, with a raised rib or shin 15, which tapers forwardly to the nose or point of the sweep. The rear end of the rib or shin 15 is extended into a shank 17, said shank merging into the rib, and the inclined sides of said rib and shank being flush and continuous from one to the other, whereby the rib 15 constitutes a forward continuation of the shank merging into the sweep proper. Said shank and rib are of inverted V-shaped cross section, with the rib or shin 15 forming a raised ridge or portion above the adjacent ends of the wings 14, and there being angles 16 between said rib or portion 15 of the shank and the wings. The rib 15 and shank 17 are thus inclined at a greater angle than the wings 14, and said rib or shin 15 and shank 17 can be of minimum width and their opposite sides inclined sufficiently to offer minimum resistance to the draft. The shank and rib have a comparatively sharp forward edge to cut through the soil and vegetation, or to split them apart, and the opposite sides of said rib and shank are inclined so as to deflect the dirt and trash to the opposite sides behind the wings 14.

The shank 17 is formed with integral means for fastening it to a standard or stock, and, for this purpose, the shank 17 has flanges 18 at the rear lower edges of its opposite sides bent toward one another behind or under the shank and spaced apart. These flanges 18 also form a bracing connection with the wings or blades 14. Thus, the forward ends of said flanges are continued or connected to the rear edges of the blades 14, thereby forming webs 19 uniting the forward ends of the flanges and the adjacent portions of the rear edges of the wings. In the formation of the sweep, the metal being worked either hot or cold, the webs or portions 19 of the flanges between the shank and wings are worked or bent back under the rear ends of the angle portions or bends 16. This will rigidly connect the flanges 18 of the shank and the wings 14, to provide means for bracing the shank and wings relatively to one another, to add considerable strength to the sweep. The provision of the webs or portions 19 connecting the flanges 18 and the rear edge portions of the wings 14 adjacent to the shank is of considerable advantage, because of the formation of the sweep from a blank of sheet metal, in order to obtain a stiffening and bracing means between the shank and wings, so as to avoid the accidental bending or breaking of the sweep between the shank and wings. In fact, the edges of the metal continues from the rear edges of the wings 14 along the edges of the webs 19 (which are bent back behind the junctures of the wings and shank) to the edges of the flanges 18. In this way, the adjacent ends of the rear edges of the wings are practically continuous with the flanges 18, and the webs 19 between the flanges and wings thereby form the braces. Furthermore, it will be noted that the forward end portions of the flanges 18 and the webs 19 project forwardly beyond the corners between the rear edges of the wings and the corresponding sides of the shank, said webs being bent back completely under the rear edge portions of the wings. In addition to the bracing action of said webs, the arrangement thereof has other advantages. Thus, the flanges 18 project closer toward the point, so that the lower or forward ends of the flanges can be engaged by securing means located at the basal end of the shank. The shank can also be of shorter length than if the flanges only started above or in rear of said basal end of the shank. Also, by the arrangement of the webs 19, the forward or lower ends of the flanges are not obstructed, as will be apparent by reference to Fig. 5, so that the flanges can be slid longitudinally in either direction into and out of engagement with the securing means, as will be described presently.

Figure 5:
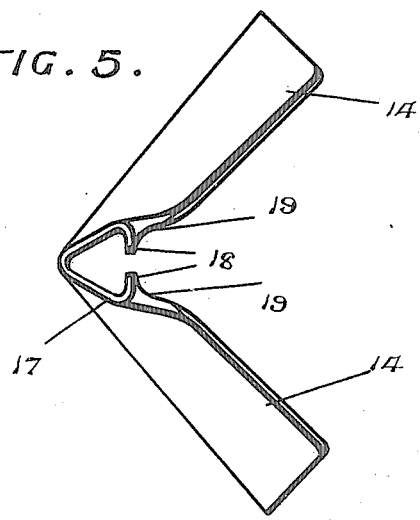
Fig. 5 is a rear end view looking longitudinally of the shank.
Figure 11:
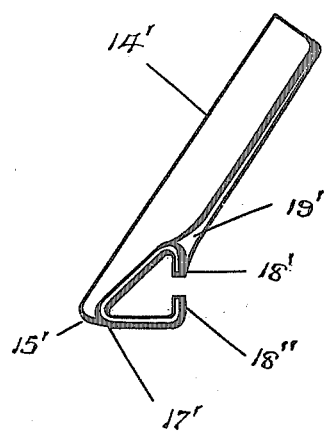
Fig. 11 is a rear view of the half sweep looking longitudinally of the shank.
Figure 8:
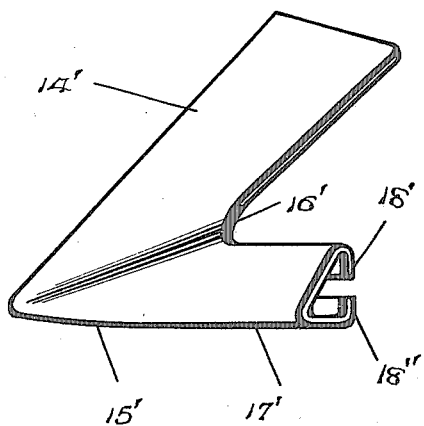
Fig. 8 is a top plan view of a half or single wing sweep.
Figure 9:
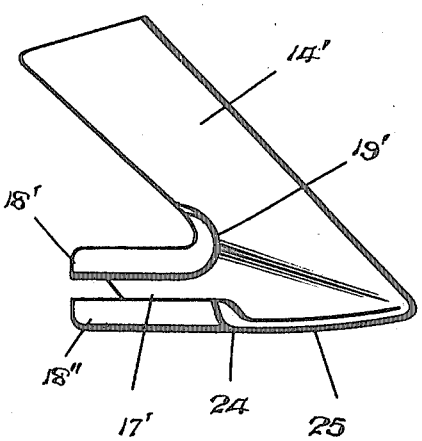
Fig. 9 is a bottom plan view of the modified form of sweep shown in Fig. 8.
Figure 10:
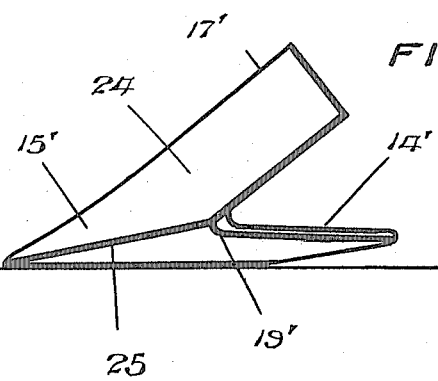
Fig. 10 is a side elevation of said half sweep.

The inturned flanges 18 of the shank provide abutments to bear on the standard or stock 20 of the cultivator at the opposite sides of the longitudinal slot of said standard, and bolts 12 which extend through said slot are used for clamping the shank 17 to the standard, the shank 17 being slid lengthwise onto the standard to bring the flanges 18 under the heads 22 of the bolts, thus providing for the quick attachment and adjustment of the sweep. The bolts 21 have nuts 23 at their lower ends, which can be tightened, for clamping the flanges 18 between the heads 22 and standard, with the said heads located within and shielded by the shank 17. The securing bolts or means are thus concealed underneath or behind the shank, out of the way, so that the sweep and its shank have no obstructions thereon, or in rear thereof, on which trash could accumulate. The shank 17 will therefore shed the dirt and trash to the opposite sides, and the shank can be of minimum width, so as to offer the least amount of resistance in cutting or cleaving the ground and roots. There are no bolt holes in the shank to weaken same, and the manner in which the shank and sweep wings or blades are united, give the construction strength and rigidity. By the arrangement of the webs 19, the forward or lower ends of the flanges can not only project nearer to the point, but said forward end portions of the flanges are also unobstructed above and below, as seen in Fig. 5, which enables the flanges to be moved in either direction into and out of engagement with the securing elements. Thus, reference being had to Fig. 4, when the nuts 23 are loosened, the sweep can be slid upwardly and rearwardly to remove same from the bolts and standard. Conversely, the flanges 18 can be positioned on the standard and slid forwardly and downwardly under the heads 22 of the bolts in applying the sweep to the standard.

The sweep is particularly desirable for shallow working of the soil, for cutting and loosening the roots of weeds, grass and other undesirable vegetation, as well as loosening the top soil, without opening up furrows, thus providing for level cultivation and the uniform stirring of the top soil. The sweep has a light draft, and is easily drawn through the soil under the surface thereof.

In Figs. 8, 9, 10 and 11, there is shown a half or off-bearing sweep, having a single wing or blade 14'. The sweep shown is a right hand sweep, but it can be made in left hand form also, as will be apparent. The sweep is formed from a single blank of sheet metal, and has the raised ridge or rib 15' at the forward or "inner" end of the wing 14', with a reentrant angle or bend 16' between the corresponding side of said rib and the wing, similar to the angle between each wing 14 and the rib of the full sweep above described. The rib 15' is extended rearwardly to form the shank 17' which has the inturned flanges 18' and 18" at its rearturned edges, for securing the half sweep to the standard or stock the same as the whole sweep. The side of the shank adjacent to the wing 14 is inclined, as in the first form, while the opposite side 24 is vertical, and has its lower end cut obliquely from the point or nose of the sweep, as at 25. There is a bracing web 19' between the end of the flange 18' and the edge of the wing 14', the same as between either wing 14 and corresponding flange 18 of the full sweep.

This application is, in part, a continuation of the application filed October 21, 1920, Serial No. 418,356.

Having thus described the invention, what is claimed as new is:—

A cultivator sweep comprising a wing, a raised rib at one end of the wing with an angle between said wing and rib, a shank extended rearwardly from said rib, said wing being inclined and said rib and shank being inclined at a greater angle than the wing, the rib and shank having rearwardly diverging sides with a ridge between them forming a shin, the side of the shank adjacent to the wing having an inturned flange at its rear edge behind the shank and extending toward the opposite side of the shank for securing the shank to a standard, and a web connecting the forward end of said flange and rear edge of the wing and bent back forwardly under the juncture of said wing and rib, the forward end portion of said flange and the web projecting forwardly beyond the corner between the rear edge of the wing and the corresponding side of the shank and leaving the forward end portion of the flange unobstructed by the web above and below said flange.

In testimony whereof I have signed my name to this specification in the presence of two subscribing witnesses.

CARL M. HOEREGOTT.

Witnesses:
J. T. BOND,
R. R. PARKER.